(12) United States Patent
Sano

(10) Patent No.: US 8,498,061 B2
(45) Date of Patent: Jul. 30, 2013

(54) IMAGE PICKUP LENS

(75) Inventor: Eigo Sano, Tokyo (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/540,254

(22) Filed: Jul. 2, 2012

(65) Prior Publication Data

US 2013/0002920 A1 Jan. 3, 2013

(30) Foreign Application Priority Data

Jun. 30, 2011 (JP) ................... 2011-146007

(51) Int. Cl.
*G02B 3/02* (2006.01)
*G02B 9/60* (2006.01)
(52) U.S. Cl.
USPC ............ 359/714; 359/740; 359/763; 359/764

(58) Field of Classification Search
USPC .................. 359/714, 740, 763, 764
See application file for complete search history.

(56) References Cited

U.S. PATENT DOCUMENTS

| 8,184,383 B2 * | 5/2012 | Shinohara ..................... 359/715 |
| 8,203,796 B2 * | 6/2012 | Ohtsu ........................... 359/714 |
| 2007/0229984 A1 | 10/2007 | Shinohara | |
| 2007/0236811 A1 | 10/2007 | Mori | |
| 2009/0122423 A1 | 5/2009 | Park et al. | |
| 2011/0134305 A1 | 6/2011 | Sano et al. | |
| 2012/0293682 A1 * | 11/2012 | Ohtsu ........................... 359/764 |

FOREIGN PATENT DOCUMENTS

| JP | 07-120671 | 5/1995 |
| JP | 2007-298572 | 11/2007 |

* cited by examiner

*Primary Examiner* — Evelyn A. Lester
(74) *Attorney, Agent, or Firm* — Cozen O'Connor

(57) ABSTRACT

An image pickup lens has a configuration of five lenses whose aberrations are corrected favorably despite its compactness compared to a conventional type.

13 Claims, 10 Drawing Sheets

FIG.2A  FIG.2B  FIG.2C
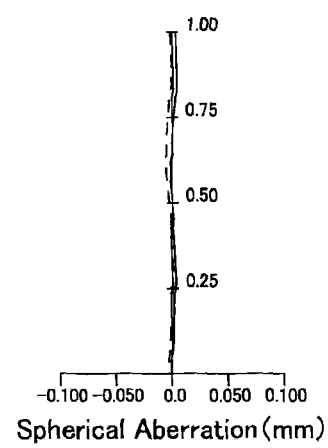
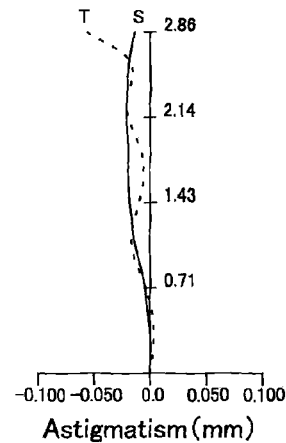
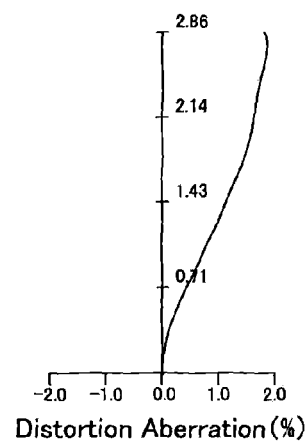
FIG.2D
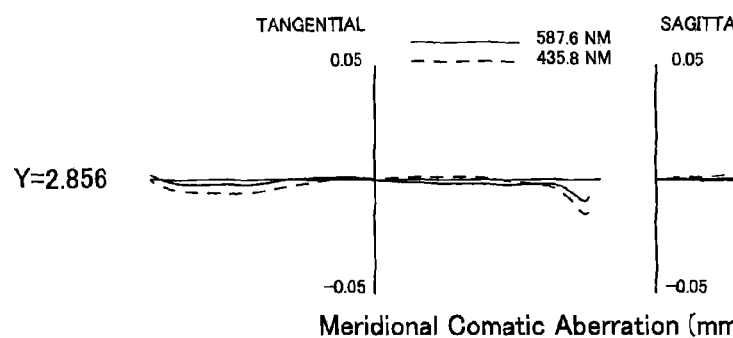
FIG.2E
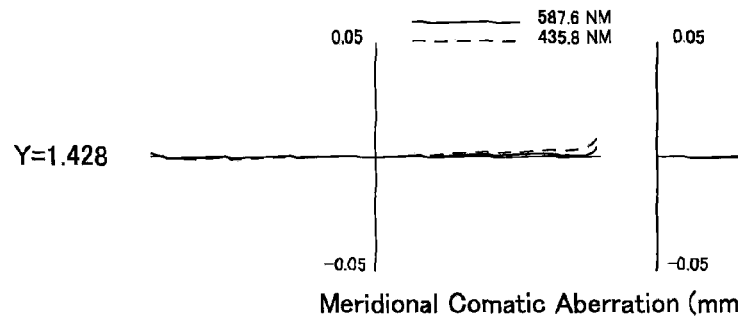

FIG.4A  FIG.4B  FIG.4C
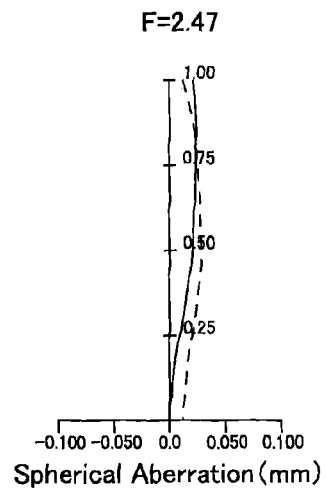
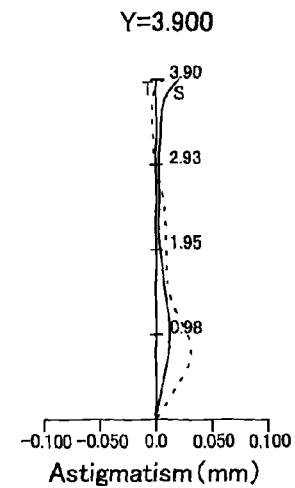
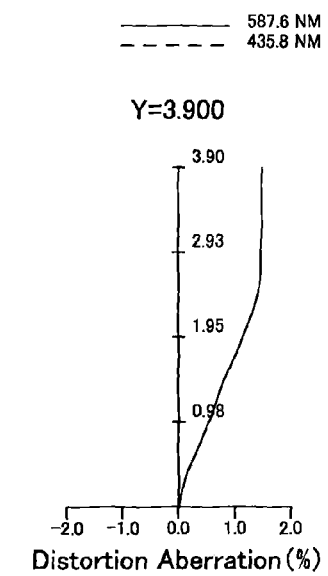
FIG.4D
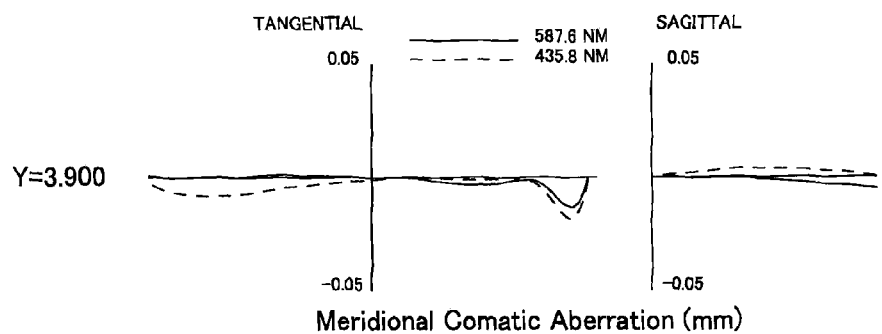
FIG.4E
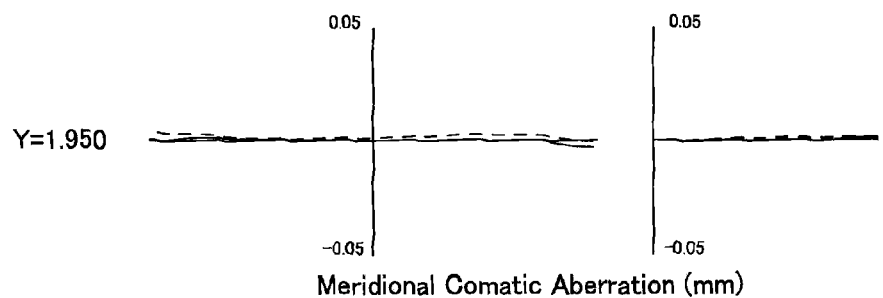

F=2.22
Spherical Aberration (mm)

Y=2.872
Astigmatism (mm)

——— 587.6 NM
– – – 435.8 NM

Y=2.872
Distortion Aberration (%)

TANGENTIAL ——— 587.6 NM SAGITTAL
– – – 435.8 NM

Y=2.872

Meridional Comatic Aberration (mm)

Y=1.436

Meridional Comatic Aberration (mm)

FIG.8A    FIG.8B    FIG.8C
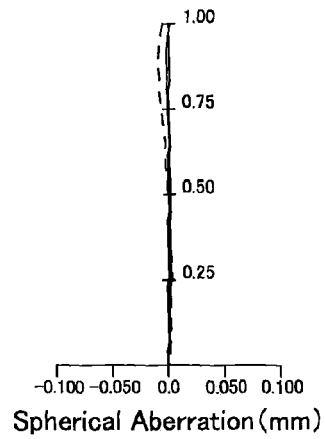 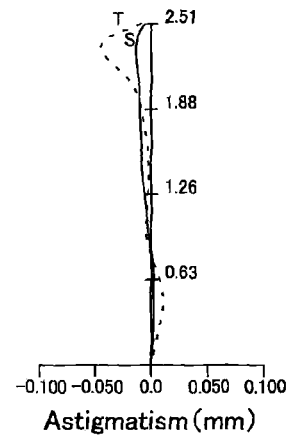 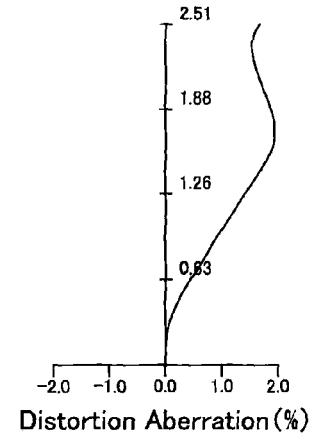
FIG.8D
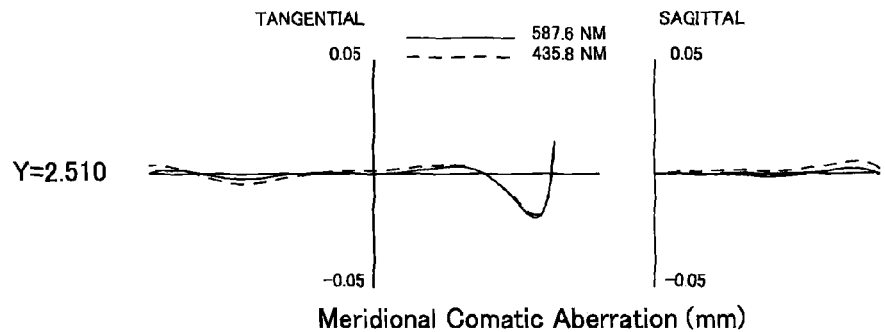
FIG.8E
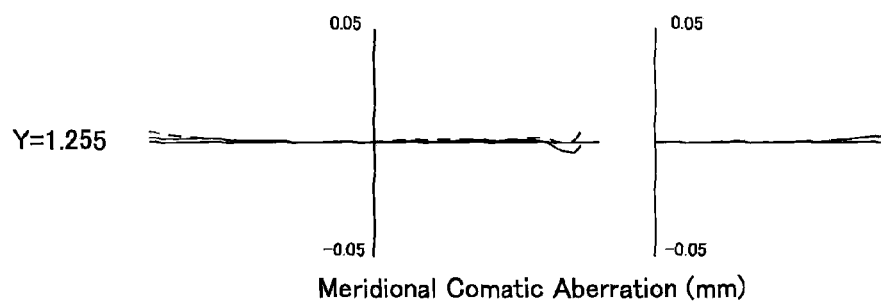

FIG.10A    FIG.10B    FIG.10C
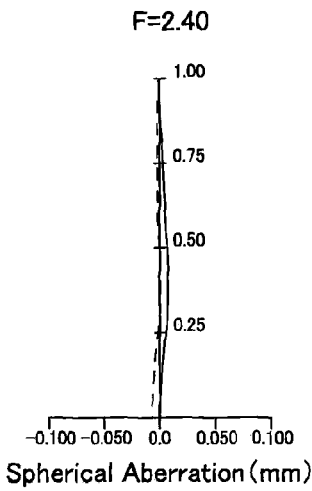
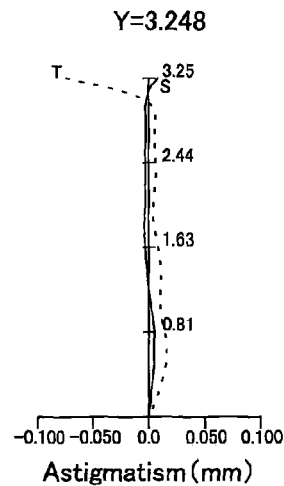
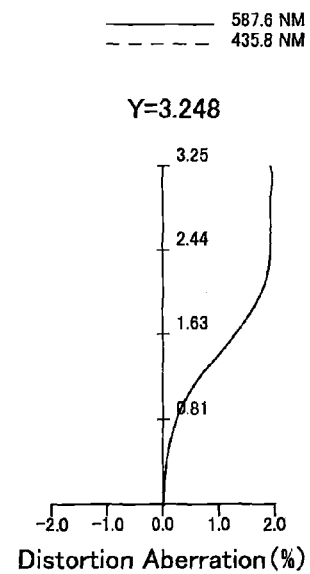
Spherical Aberration (mm)    Astigmatism (mm)    Distortion Aberration (%)
FIG.10D
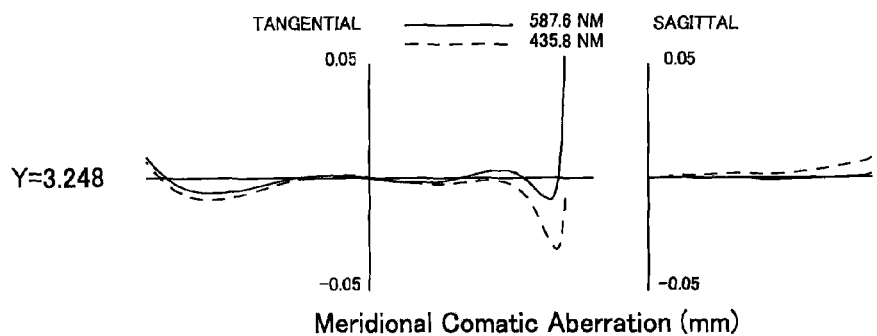
Meridional Comatic Aberration (mm)
FIG.10E
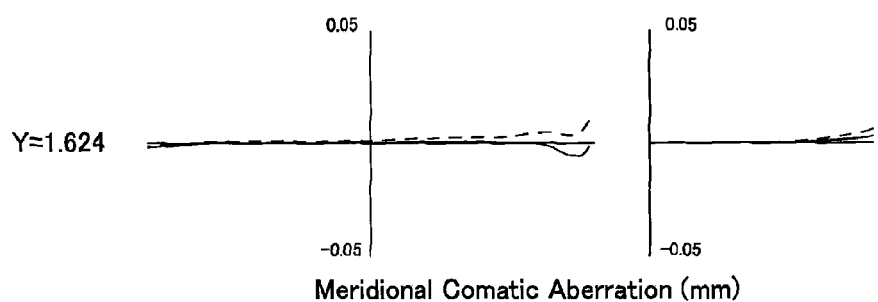
Meridional Comatic Aberration (mm)

IMAGE PICKUP LENS

The present application claims priority to Japanese Patent Application No. 2011-146007 filed Jun. 30, 2011, the entire content of which is hereby incorporated by reference.

BACKGROUND OF THE INVENTION

1. Field of the Invention

The present invention relates to a compact image pickup lens for an image pickup apparatus incorporating a solid-state image sensor, such as a CCD type image sensor and a CMOS type image sensor.

2. Description of the Related Art

In recent years, accompanying the improvement in performance and reduction in size of an image pickup apparatus using a solid-state image sensor, such as a charge coupled device (CCD) type image sensor and a complementary metal oxide semiconductor (CMOS) type image sensor, mobile telephones and portable information terminals including such an image pickup apparatus are spreading. Further, an image pickup lens mounted in such an image pickup apparatus is demanded increasingly for further reduction in size and improvement in performance. As an image pickup lens intended for such a use, there has been proposed an image pickup lens having a configuration of five lenses because of the possibility of improvement in performance compared to a lens having a configuration of three or four lenses.

As an image pickup lens having a configuration of five lenses, an image pickup lens has been disclosed, which is configured by a first lens having a positive power, a second lens having a negative power, a third lens having a positive power, a fourth lens having a negative power, and a fifth lens having a negative power in this order from an object side (for example, Patent Literature 1).

Further, an image pickup lens has been disclosed, which is configured by a first lens having a negative power, a second lens having a positive power, a third lens having a negative power, a fourth lens having a positive power, and a fifth lens having a negative power in this order from the object side (for example, Patent Literature 2).

However, in the image pickup lens described in above Patent Literature 1, the first lens to the third lens contribute to most of the power of the entire system and the fourth lens and the fifth lens have only the effect as an image plane correcting lens having a weak power, and therefore, the image pickup lens has such a problem that aberration correction is insufficient and if the total length of the lens is reduced, it becomes difficult for the image pickup lens to cope with a larger number of pixels in the image sensor because of deterioration in performance.

Further, in the image pickup lens described in above Patent Literature 2, the former group configured by the first lens and the second lens includes a spherical surface system, and therefore, it is not possible to secure excellent performance because of insufficient correction of spherical aberration and comatic aberration. Furthermore, because not only the former group but also the latter group including the third lens and subsequent lenses has a configuration of the positive power, the principal point position of the optical system is on the image side and the back focus is increased compared to a telephoto type configuration in which the latter group has a negative power, and therefore, this is a type disadvantageous in downsizing.

PTL 1: U.S. Patent Publication No. 2007-0229984
PTL 2: U.S. Patent Publication No. 2007-0236811

SUMMARY OF THE INVENTION

The present invention has been made in view of those problems, and an object thereof is to provide an image pickup lens having a configuration of five lenses whose aberrations are corrected favorably despite its compactness compared to a conventional type.

Here, about the scale of a compact image pickup lens, the present invention aims at the level of compactness that satisfies the following expression. By satisfying this range, it is made possible to reduce the size and weight of the entire image pickup apparatus, $$L/2Y<1.00 \tag{20}$$

where L is a distance on an optical axis from the lens surface nearest to the object side in the entire system of the image pickup lens to the focal point on the image side, and 2Y is the diagonal length of the image pickup surface of a solid-state image sensor (diagonal length of the rectangular effective pixel region of the solid-state image sensor).

Here, the focal point on the image side refers to an image point when parallel rays parallel to the optical axis enter the image pickup lens. When an optical low pass filter, an infrared-cut filter, or a parallel flat plate, such as a seal glass of a solid-state image sensor package, is disposed between the surface nearest to the image side in the image pickup lens and the image side focal point position, the value of L described above is calculated on the assumption that a space of the parallel flat plate part is regarded as an air-equivalent distance. Further, more desirably, the range specified by the following expression is satisfied, $$L/2Y<0.90 \tag{20}'$$

An image pickup lens according to the present invention is an image pickup lens for forming an image of a subject on a photoelectric conversion part of a solid-state image sensor and includes or essentially consists of, in order from an object side thereof: a first lens having a positive power and having a convex surface directed to an object side; a second lens of a meniscus shape having a negative power and having a convex surface directed to the object side; a third lens having an aspheric shape on the image side surface; a fourth lens having a positive power and having a convex surface directed to the image side; and a fifth lens having a negative power and having a concave surface directed to the image side. Here, "to include" means "to substantially include". An image side surface of the fifth lens has an aspheric shape and has an inflection point at a position other than the intersection with the optical axis and the image pickup lens of the present invention satisfies the following conditional expressions, $$-0.003<f/r6<0.003 \tag{1}$$

$$0<(SAG6P/f)\times1{,}000<10.0 \tag{2}$$

where f is the focal length of the entire system of the image pickup lens, r6 is the radius of curvature on the image side surface of the third lens, and SAG6P is the maximum amount of sag in the region on the image side surface of the third lens through which axial light flux or rays (light flux from the point on the axis) pass.

The fundamental configuration of the image pickup lens according to the present invention includes: a first lens having a positive power and having a convex surface directed to an object side; a second lens of a meniscus shape having a negative power and having a convex surface directed to the object side; a third lens having an aspheric shape on the image side surface; a fourth lens having a positive power and having a convex surface directed to the image side; and a fifth lens having a negative power and having a concave surface directed to the image side as described above. A so-called telephoto type lens configuration in which a positive lens group including the first lens, the second lens, the third lens, and the fourth lens in this order from the object side and the fifth negative lens are disposed is advantageous in reducing the total length of the image pick-up lens.

Further, by using two or more negative lenses in the configuration of five lenses, it is made easy to correct the Petzval sum because the number of surfaces having a divergent effect is increased and it is made possible to obtain an image pickup lens that secures the excellent image quality even on the periphery of the image plane or area (or picture plane). Furthermore, by forming the second lens into the shape of a meniscus, it is possible to dispose the composite principle point position of the entire system of the image pickup lens nearer to the object side and to turn the image side surface of the second lens into a strong divergent surface, and therefore, it is made easy to correct the comatic aberration and distortion aberration.

By forming the image side surface of the fifth lens disposed nearest to the image side into an aspherical surface, it is possible to favorably correct aberrations on the periphery of the image plane or area. Further, by forming the image side surface of the fifth lens into the shape of an aspherical surface having an inflection point at a position other than the intersection with the optical axis, it is made easy to secure the telecentric characteristics of the image side rays. Here, an "inflection point" refers to a point on an aspherical surface at which a tangential plane at a peak of the aspheric surface is perpendicular to the optical axis in a curve of sectional shape of the lens within an effective radius.

The effect of the third lens in the present invention is explained in detail. In the present invention, the paraxial power of the third lens can be set weak to cause the third lens to have the effect of indirectly compensating aberration correction of the second lens or the fourth lens. Specifically, the configuration is such that the second lens and the fourth lens having a comparatively strong paraxial power perform the aberration correction at the center of the image plane or area and the third lens contributes only to slight modification of the curvature of field and distortion aberration on the periphery of the image plane. In general, as the paraxial power increases, the deterioration in performance at the time of occurrence of a manufacturing error increases, and therefore, it is desirable to suppress as small as possible the power near the center of the third lens that does not contribute to the aberration correction. Further, it is possible to reduce the total length of the image pickup lens while keeping a clearance from the second lens and the fourth lens at an appropriate level by preventing the third lens with a small power from having a large amount of sag.

In order to achieve the above, the third lens is configured to satisfy the conditional expression (1) and the conditional expression (2). By setting the amount of sag near the center of the image side surface of the third lens to the range specified by the conditional expression (2) while setting the radius of curvature of the image side surface of the third lens to the range specified by the conditional expression (1), it is possible to suppress small the power near the center of the image side surface of the third lens and to reduce the deterioration in performance at the time of occurrence of a manufacturing error. On the other hand, the image side surface of the third lens has an aspheric shape, and therefore, has power on the periphery and it is possible to perform excellent aberration correction on the periphery of the image plane or area. The amount of sag on the periphery of the lens is prevented from increasing by preventing the upper limit of the conditional expression (2) from being exceeded, and thereby, it is no longer necessary to provide a large clearance before and after the lens, and therefore, it is made easy to reduce the total length of the image pickup lens. On the other hand, by preventing the lower limit of the conditional expression (2) from being exceeded, it is possible to make the aberration correction on the periphery of the image plane comparatively favorable.

From the above, by satisfying the ranges specified by the conditional expression (1) and the conditional expression (2), it is made possible to obtain an image pickup lens having a further small optical overall length by keeping to a minimum the deterioration in performance at the center of the image plane or area at the time of occurrence of a manufacturing error while performing favorable aberration correction from the center part to the periphery of the image plane.

Further, from the viewpoint described above, more desirably, the value f/r6 and the value SAG6P/f are set to the ranges specified by the following expressions, $$-0.002 < f/r6 < 0.002 \quad (1)'$$

$$0 < (SAG6P/f) \times 1,000 < 9.0 \quad (2)'.$$

In a specific aspect of the present invention, the above-mentioned image pickup lens satisfies the following conditional expression, $$0 < |P3|/P < 0.60 \quad (3)$$

where P3 is the power of the third lens and P is the power of the entire system of the image pickup lens.

The conditional expression (3) is a conditional expression for appropriately setting the power of the third lens, for causing reduction in the total length of the image pickup lens and aberration correction to coexist, and for suppressing to a minimum the deterioration in performance at the time of occurrence of a manufacturing error. By setting the power of the third lens to the range specified by the conditional expression (3), the power of the third lens is prevented from becoming too strong, and it is possible to reduce the total length of the image pickup lens and to reduce the deterioration in performance at the time of occurrence of a manufacturing error. Further, as described previously, the third lens has an aspheric shape at least on the image side surface, and therefore, it is possible to favorably perform aberration correction on the periphery of the image plane or area without increasing the paraxial power of the third lens. More desirably, the value |P3|/P is set to the range specified by the following expression, $$0 < |P3|/P < 0.5 \quad (3)'.$$

Another specific aspect of the present invention satisfies the following conditional expression, $$0.05 < d34/f < 0.20 \quad (4)$$

where d34 is an air separation on the axis between the third lens and the fourth lens and f is the focal length of the entire system of the image pickup lens.

When the value is less than the upper limit of the conditional expression (4), the separation between the third lens and the fourth lens is prevented from becoming too large and as a result, it is possible to reduce the total length of the image pickup lens. On the other hand, when the value is more than the lower limit of the conditional expression (4), it is possible to maintain a clearance between the third lens and the fourth lens at an appropriate level and to secure a space for inserting a light blocking member to prevent ghost, flare, and so on. More desirably, the value d34/f is set to the range specified by the following expression, $$0.05 < d34/f < 0.15 \tag{4}'$$

Still another specific aspect of the present invention satisfies the following conditional expression, $$-2.0 < \text{Pair23}/P < -0.6 \tag{5}$$

where P is the power of the entire system of the image pickup lens and Pair23 is the power of a so-called air lens formed by the image side surface of the second lens and the object side surface of the third lens. Here, the power is an inverse of the focal length and Pair23 described above can be found by the following expression (6), $$\text{Pair23} = \frac{1-n2}{r4} + \frac{n3-1}{r5} - \frac{(1-n2)(n3-1) \times d23}{r4 \times r5}, \tag{6}$$

where n2 is the refractive index for d-line of the second lens, n3 is the refractive index for d-line of the third lens, r4 is the radius of curvature of the image side surface of the second lens, r5 is the radius of curvature of the object side surface of the third lens, and d23 is an air separation on the axis between the second lens and the third lens.

The conditional expression (5) is a conditional expression for appropriately setting the power of the air lens formed by the image side surface of the second lens and the object side surface of the third lens. When the value is less than the upper limit of the conditional expression (5), it is possible to maintain the negative power by the air lens at an appropriate level, and therefore, the Petzval sum is prevented from becoming too large and it is possible to make the image plane flat and to favorably correct chromatic aberration also. On the other hand, when the value is more than the lower limit of the conditional expression (5), the negative power by the air lens is prevented from becoming too strong, and therefore, it is possible to increase the radius of curvature of the image side surface of the second lens and the object side surface of the third lens and the workability of the lens is improved. Further, the distance between the image side surface of the second lens and the object side surface of the third lens is increased off the axis, and therefore, it is made easy to secure a space for inserting a light blocking member to prevent unwanted light, such as ghost, between the second lens and the third lens without increasing the separation on the axis. More desirably, the value Pair23/P is set to the range specified by the following expression, $$-1.9 < \text{Pair23}/P < -0.7 \tag{5}'$$

Still another specific aspect of the present invention satisfies the following conditional expression, $$1.0 < (r7+r8)/(r7-r8) < 4.0 \tag{7}$$

where r7 is the radius of curvature of the object side surface of the fourth lens and r8 is the radius of curvature of the image side surface of the fourth lens.

The conditional expression (7) is a conditional expression for appropriately setting a shaping factor of the fourth lens. In order to reduce the total length of the image pickup lens, it is necessary to move the principal point position to the object side, and therefore, the power of the positive lens, such as the first lens, tends to become strong and the focal length of the entire system tends to decrease. In contrast to this, when the value is more than the lower limit value of the conditional expression (7), the fourth lens turns into the shape of a more remarkable meniscus, and therefore, it is possible to suppress the difference in the incidence angle between the upper marginal ray and the lower marginal ray of the rays passing off the axis, to effectively correct comatic aberration, and to move the principal point position of the fourth lens having the positive power to the image side and as a result, the focal length of the entire system can be lengthened. On the other hand, when the value is less than the upper limit value of the conditional expression (7), it is possible to suppress the occurrence of high-order aberration, such as curvature of field, by an increase in the radius of curvature of the image side surface. More desirably, the value (r7+r8)/(r7−r8) is set to the range specified by the following expression, $$1.0 < (r7+r8)/(r7-r8) < 3.5 \tag{7}'$$

Still another specific aspect of the present invention satisfies the following conditional expression, $$-1.2 < \text{Pair34}/P < 0 \tag{8},$$

where P is the power of the entire system of the image pickup lens and Pair34 is the power of a so-called air lens formed by the image side surface of the third lens and the object side surface of the fourth lens and the power is an inverse of the focal length and Pair34 described above can be found by the following expression (9), $$\text{Pair34} = \frac{1-n3}{r6} + \frac{n4-1}{r7} - \frac{(1-n3)(n4-1) \times d34}{r6 \times r7}, \tag{9}$$

where n3 is the refractive index for d-line of the third lens, n4 is the refractive index for d-line of the fourth lens, r6 is the radius of curvature of the image side surface of the third lens, r7 is the radius of curvature of the object side surface of the fourth lens, and d34 is an air separation on the axis between the third lens and the fourth lens.

When the value of the conditional expression (8) is more than the lower limit, the negative power of the air lens is prevented from becoming too strong and it is possible to suppress small the distortion aberration and comatic aberration. On the other hand, when the value is less than upper limit, it is possible to maintain the negative power at an appropriate level and by compensating for the negative power of the second lens, it is possible to improve the image plane properties by making small the Petzval sum. More desirably, the value Pair34/P is set to the range specified by the following expression, $$-1.1 < \text{Pair34}/P < 0 \tag{8}'$$

Still another specific aspect of the present invention satisfies the following conditional expression, $$0.4 < \text{Pair12}/P < 1.5 \tag{10},$$

where P is the power of the entire system of the image pickup lens and Pair12 is the power of a so-called air lens formed by the image side surface of the first lens and the object side surface of the second lens and the power is an inverse of the focal length and Pair12 described above can be found by the following expression (11), $$\text{Pair12} = \frac{1-n1}{r2} + \frac{n2-1}{r3} - \frac{(1-n1)(n2-1) \times d12}{r2 \times r3}, \tag{11}$$

where n1 is the refractive index for d-line of the first lens, n2 is the refractive index for d-line of the second lens, r2 is the radius of curvature of the image side surface of the first lens, r3 is the radius of curvature of the object side surface of the second lens, and d12 is an air separation on the axis between the first lens and the second lens.

The conditional expression (10) is a conditional expression for making appropriate the power of the air lens between the first lens and the second lens and for making appropriate the aberration correction. When the value of the conditional expression (10) is less than the upper limit, the Petzval sum is prevented from becoming too large because the power of the air lens becomes strong, and therefore, it is possible to keep the image plane flat. On the other hand, when the value of the conditional expression (10) is more than the lower limit, the power of the air lens becomes large and the principal point position of the composite lens of the first lens to the fourth lens moves to the object side, and therefore, it is possible to increase a distance d between the composite lens of the first lens to the fourth lens and the fifth lens, leading to a reduction in a total length L of the lens as a result. More desirably, the value Pair12/P is set to the range specified by the following expression, $$0.45 < Pair12/P < 1.4 \tag{10}'$$

Still another specific aspect of the present invention satisfies the following conditional expression, $$0.4 < f34/f < 0.7 \tag{12}$$

where f34 is a composite focal length of the third lens and the fourth lens and f is the focal length of the entire system of the image pickup lens.

The conditional expression (12) is a conditional expression for appropriately setting the composite focal length of the third lens and the fourth lens. When the value of the conditional expression (12) is more than the lower limit, the composite power of the third lens and the fourth lens is prevented from becoming too strong and it is possible to dispose the principal point position of the entire system of the image pickup lens to the object side, and therefore, it is possible to reduce the total length of the image pickup lens. Further, it is possible to suppress small the comatic aberration and curvature of field that occur in the fourth lens. On the other hand, when the value is less than the upper limit, it is possible to maintain the composite power of the third lens and the fourth lens at an appropriate level and it is made possible to smoothly guide the peripheral rays deflected toward the peripheral side by the second lens to the fifth lens, and therefore, it is made easy to secure the image side telecentric characteristics. More desirably, the value f34/f is set to the range specified by the following expression, $$0.45 < f34/f < 0.7 \tag{12}'$$

Still another specific aspect of the present invention satisfies the following conditional expression, $$1.0 < f123/f < 1.6 \tag{13}$$

where f123 is the composite focal length of the first lens to the third lens and f is the focal length of the entire system of the image pickup lens.

When the value of the conditional expression (13) is more than the lower limit, the composite focal length of the first lens to the third lens is prevented from becoming too short and it is possible to suppress aberrations that occur in the first lens and the second lens which tends to increase the power among the first lens to the third lens. On the other hand, when the value of the conditional expression (13) is less than the upper limit, it is possible to maintain the composite power of the first lens to the third lens at an appropriate level and to reduce the total length of the image pickup lens. More desirably, the value f123/f is set to the range specified by the following expression, $$1.1 < f123/f < 1.5 \tag{13}'$$

In a still another specific aspect of the present invention, the third lens has a positive power. By forming the third lens into a positive lens, it is possible to share the effect of the fourth positive lens and to perform favorable aberration correction.

Still another specific aspect of the present invention satisfies the following conditional expressions, $$15 < v2 < 31 \tag{14}$$

$$15 < v3 < 31 \tag{15}$$

where v2 is the Abbe number of the second lens and v3 is the Abbe number of the third lens.

The conditional expressions (14) and (15) are conditional expressions for appropriately setting the Abbe numbers of the second lens and the third lens and for favorably correcting the longitudinal chromatic aberration and the off-axis chromatic aberration. As to the second negative lens, in general, a material having a comparatively large dispersion is used because of the range specified by the conditional expression (14) by the relationship with the first positive lens, but, while it is possible to favorably correct the longitudinal chromatic aberration, the rim rays are deflected considerably toward the peripheral side because the image side surface of the second lens is a strong divergent surface and there is a trend for the chromatic aberration of magnification to increase on the periphery. Because of that, by using a material having a comparatively large dispersion also in the third lens, it is made possible to correct the chromatic aberration of magnification on the periphery that has occurred in the second lens by the third lens. Further, the third lens is a lens having a comparatively small power, and therefore, it is possible to favorably correct the off-axis chromatic aberration without over-correcting the longitudinal chromatic aberration even when a material having a comparatively large dispersion is used.

Consequently, when the value of the conditional expression (15) is more than the lower limit, it is possible for the third lens to sufficiently correct the chromatic aberration of magnification that has occurred in the second lens, and as a result to reduce the chromatic aberration of magnification. On the other hand, when the value is less than the upper limit, it is possible to suppress small the chromatic aberration of magnification, and sufficiently correct the longitudinal chromatic aberration. More desirably, the value v2 and the value v3 are set to the ranges specified by the following expressions, $$15 < v2 < 27 \tag{14}'$$

$$15 < v3 < 27 \tag{15}'$$

In a still another specific aspect of the present invention, the image side surface of the third lens has a negative power on the outermost periphery. By the outermost periphery of the image side surface of the third lens having the negative power, it is possible to share the deflecting action on the periphery of the second lens with the third lens and it is no longer necessary to deflect rays extremely by the second lens, and therefore, advantageous in correction of the curvature of field and distortion aberration. The outermost periphery of the image side surface of the third lens means a region through which the light rays incident on the diagonal position of the image forming surface pass.

A still another specific aspect of the present invention further has a lens having substantially no power.

BRIEF DESCRIPTION OF THE DRAWINGS

FIG. 2A to FIG. 2E are aberration diagrams of the image pickup lens of Example 1.

FIG. 4A to FIG. 4E are aberration diagrams of the image pickup lens of Example 2.

FIG. 8A to FIG. 8E are aberration diagrams of the image pickup lens of Example 4.

FIG. 10A to FIG. 10E are aberration diagrams of the image pickup lens of Example 5.

DESCRIPTION OF THE EMBODIMENTS

Hereinafter, with reference to FIG. 1 etc., an image pickup lens of an embodiment of the present invention is explained. An image pickup lens 10 illustrated in FIG. 1 has the same configuration as that of an image pickup lens 11 of Example 1, to be described later.

Figure 1:
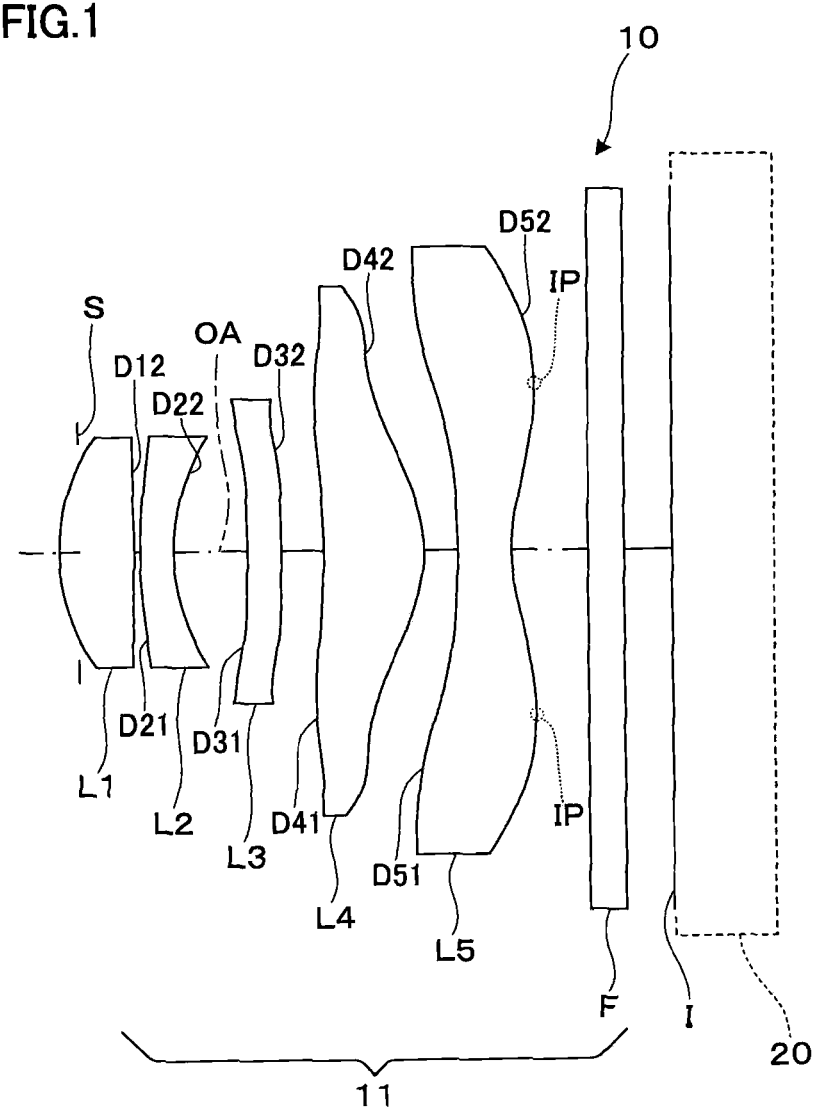
FIG. 1 is a sectional diagram of an image pickup lens according to an embodiment of the present invention, also of an image pickup lens of Example 1.

As shown in FIG. 1, the image pickup lens 10 of the embodiment is for forming an image of a subject on a photoelectric conversion part 20 of a solid-state image sensor and includes, in order from an object side, a first lens L1 having a positive power and having a convex surface directed to the object side, a second lens L2 of a meniscus shape having a negative power and having a convex surface directed to the object side, a third lens L3 having an aspheric shape on the image side surface, a fourth lens L4 having a positive power and having a convex surface directed to the image side, and a fifth lens L5 having a negative power and having a concave surface directed to the image side. Here, an image side surface D52 of the fifth lens L5 has an aspheric shape and has an inflection point IP at a position other than the intersection with an optical axis OA. For example, on the incidence side, that is, the object side of the first lens L1, an aperture stop S is disposed. On the exit side, that is, the image side of the fifth lens L5, a parallel flat plate F and the photoelectric conversion part 20 of the solid-state image sensor are disposed and, on an image pickup surface I of the photoelectric conversion part 20, an image is formed by the image pickup lens 10.

To explain more specifically, the first lens L1 is a biconvex aspheric lens. The second lens L2 is an aspheric meniscus lens the incidence side, that is, the object side of which is convex and the image side of which is concave. The third lens L3 is an aspheric convex-plane lens the object side of which is comparatively moderately convex and the image side of which is flat in the paraxial area, and having a negative power on the outermost periphery. The fourth lens L4 is an aspheric meniscus lens the object side of which is concave and the image side of which is convex in the paraxial area. The fifth lens L5 is a biconcave aspheric lens in the paraxial area. As the parallel flat plate F, an optical low pass filter, IR-cut filter, seal glass of the photoelectric conversion part 20, etc., are supposed.

This image pickup lens 10 has a lens configuration of so-called telephoto type and is advantageous in reducing the total length of the image pickup lens 10. Further, by causing at least the two lenses L2 and L5 of the five lenses L1 to L5 to be negative lenses, it is made possible to obtain the image pickup lens 10 that has secured excellent image quality even on the periphery of the image plane or area. Further, by forming the second lens L2 into the shape of a meniscus, it is possible to dispose the composite principal point position of the entire system of the image pickup lens nearer to the object side and to make it easy to correct the comatic aberration and distortion aberration. Further, by forming the image side surface D52 of the fifth lens L5 disposed nearest to the image pickup surface I side into an aspherical surface, it is possible to favorably correct aberrations on the periphery of the image plane and by causing the aspheric image side surface D52 of the fifth lens L5 to have the inflection point IP at a position other than the intersection with the optical axis OA, it is made easier to secure the telecentric characteristics of the image side light rays.

In particular, the third lens L3 having a small paraxial power contributes only to slight modification of the curvature of field and distortion aberration on the periphery of the image pickup surface I and the second lens and the fourth lens having a comparatively strong paraxial power are caused to correct aberration at the center of the image plane or area. Due to this, it is possible to reduce the total length of the image pickup lens 10 while suppressing the deterioration in performance at the time of occurrence of a manufacturing error. Further, an image side surface D32 of the third lens L3 has a negative power on the outermost periphery. Due to this, it is possible to share the deflecting action toward the peripheral part by the second lens L2 with the third lens L3 and it is no longer necessary to deflect the rays extremely by the second lens L2, and therefore, advantageous in correction of the curvature of field and distortion aberration.

The image pickup lens 10 described above satisfies the already explained conditional expressions (1) and (2), $$-0.003 < f/r6 < 0.003 \qquad (1)$$

$$0 < (SAG6P/f) \times 1,000 < 10.0 \qquad (2)$$

wherein f is the focal length of the entire system of the image pickup lens 10, r6 is the radius of curvature of the image side surface D32 of the third lens L3, and SAG6P is the maximum amount of sag in the region through which axial light flux or rays on the image side surface D32 of the third lens L3 pass.

More desirably, the image pickup lens 10 satisfies expressions (1)' and (2)' below, which further limit or restrict the above-mentioned conditional expressions (1) and (2), $$-0.002 < f/r6 < 0.002 \qquad (1)'$$

$$0 < (SAG6P/f) \times 1,000 < 9.0 \qquad (2)'.$$

The image pickup lens 10 of the embodiment further satisfies the conditional expression (3) already explained in addition to the above-mentioned conditional expressions (1) and (2), $$0 < |P3|/P < 0.60 \qquad (3)$$

where P3 is the power of the third lens L3 and P is the power of the entire system of the image pickup lens 10.

More desirably, the image pickup lens 10 satisfies expression (3)' below, which further limits or restricts the above-mentioned conditional expression (3), $$0<|P3|/P<0.50 \quad (3)'$$

The image pickup lens 10 of the embodiment further satisfies the conditional expression (4) already explained in addition to the above-mentioned conditional expressions (1) and (2), $$0.05<d34/f<0.20 \quad (4)$$

where d34 is an air separation on the optical axis OA between the third lens L3 and the fourth lens L4.

More desirably, the image pickup lens 10 satisfies expression (4)' below, which further limits or restricts the above-mentioned conditional expression (4), $$0.05<d34/f<0.15 \quad (4)'$$

The image pickup lens 10 of the embodiment further satisfies the conditional expression (5) already explained in addition to the above-mentioned conditional expressions (1) and (2), $$-2.0<Pair23/P<-0.6 \quad (5)$$

where Pair23 is the power of a so-called air lens formed by an image side surface D22 of the second lens L2 and an object side surface D31 of the third lens L3.

More desirably, the image pickup lens 10 satisfies expression (5)' below, which further limits or restricts the above-mentioned conditional expression (5), $$-1.9<Pair23/P<-0.7 \quad (5)'$$

The image pickup lens 10 of the embodiment further satisfies the conditional expression (7) already explained in addition to the above-mentioned conditional expressions (1) and (2), $$1.0<(r7+r8)/(r7-r8)<4.0 \quad (7)$$

where r7 is the radius of curvature of an object side surface D41 of the fourth lens L4 and r8 is the radius of curvature of an image side surface D42 of the fourth lens L4.

More desirably, the image pickup lens 10 satisfies expression (7)' below, which further limits or restricts the above-mentioned conditional expression (7), $$1.0<(r7+r8)/(r7-r8)<3.5 \quad (7)'$$

The image pickup lens 10 of the embodiment further satisfies the conditional expression (8) already explained in addition to the above-mentioned conditional expressions (1) and (2), $$-1.2<Pair34/P<0 \quad (8)$$

where Pair34 is the power of a so-called air lens formed by the image side surface D32 of the third lens L3 and the object side surface D41 of the fourth lens L4.

More desirably, the image pickup lens 10 satisfies expression (8)' below, which further limits or restricts the above-mentioned conditional expression (8), $$-1.1<Pair34/P<0 \quad (8)'$$

The image pickup lens 10 of the embodiment further satisfies the conditional expression (10) already explained in addition to the above-mentioned conditional expressions (1) and (2), $$0.4<Pair12/P<1.5 \quad (10)$$

where Pair12 is the power of a so-called air lens formed by an image side surface D12 of the first lens L1 and an object side surface D21 of the second lens L2.

More desirably, the image pickup lens 10 satisfies expression (10)' below, which further limits or restricts the above-mentioned conditional expression (10), $$0.45<Pair12/P<1.4 \quad (10)'$$

The image pickup lens 10 of the embodiment further satisfies the conditional expression (12) already explained in addition to the above-mentioned conditional expressions (1) and (2), $$0.4<f34/f<0.7 \quad (12)$$

where f34 is the composite focal length of the third lens L3 and the fourth lens L4.

More desirably, the image pickup lens 10 satisfies expression (12)' below, which further limits or restricts the above-mentioned conditional expression (12), $$0.45<f34/f<0.7 \quad (12)'$$

The image pickup lens 10 of the embodiment further satisfies the conditional expression (13) already explained in addition to the above-mentioned conditional expressions (1) and (2), $$1.0<f123/f<1.6 \quad (13)$$

where f123 is the composite focal length of the first lens L1 to the third lens L3.

More desirably, the image pickup lens 10 satisfies expression (13)' below, which further limits or restricts the above-mentioned conditional expression (13), $$1.1<f123/f<1.5 \quad (13)'$$

The image pickup lens 10 of the embodiment further satisfies the conditional expressions (14) and (15) already explained in addition to the above-mentioned conditional expressions (1) and (2), $$15<\nu2<31 \quad (14)$$

$$15<\nu3<31 \quad (15)$$

where ν2 is the Abbe number of the second lens L2 and ν3 is the Abbe number of the third lens L3.

More desirably, the image pickup lens 10 satisfies expressions (14)' and (15)' below, which further limit or restrict the above-mentioned conditional expressions (14) and (15), $$15<\nu2<27 \quad (14)'$$

$$15<\nu3<27 \quad (15)'$$

All the five lenses L1 to L5 configuring the image pickup lens 10 described above are formed of the plastic material. In this case, mass-production of the inexpensive lenses L1 to L5 even with a small radius of curvature and a small outer diameter is enabled. Further, the press temperature of the plastic lens can be reduced, and therefore, it is possible to suppress the abrasion of the molding die and as a result of that, it is possible to aim at reduction in costs by reducing the number of times of replacement and maintenance of the molding die.

EXAMPLES

Hereinafter, specific Examples of the image pickup lens of the present invention are explained. Symbols used in each Example are as follows.

f: Focal length of the entire system of the image pickup lens
fB: Back focus
F: F-number 2Y: Diagonal length of the image pickup surface of the solid-state image sensor ENTP: Entrance pupil position (distance from the first surface to the entrance pupil position)

EXTP: Exit pupil position (distance from the image pickup surface to the exit pupil position)

H1: Front principal point position (distance from the first surface to the front principal point position)

H2: Back principal point position (distance from the final or rearmost surface to the back principal point position)

R: Radius of curvature

D: Axial surface separation or distance

Nd: Refractive index for d-line of the lens material vd: Abbe number or constant of the lens material In each embodiment, the surface whose surface number is followed by "*" is an aspherical surface and the shape of the aspherical surface is represented by "Formula 1" below where the vertex of the surface is taken as the origin, the X axis is in the direction of the optical axis OA, and the height in the direction perpendicular to the optical axis OA is h.

$$X = \frac{h^2/R}{1 + \sqrt{1-(1+K)h^2/R^2}} + \sum A_i h^i \quad \text{[Formula 1]}$$

wherein $A_i$ is the i-th order aspheric coefficient, R is the radius of curvature, and K is the conic constant.

Example 1

General specifications of the image pickup lens of Example 1 are as follows.

f=4.32 mm fB=0.4 mm

F=2.4

2Y=5.712 mm

ENTP=0 mm

EXTP=−2.98 mm

H1=−1.21 mm

H2=−3.92 mm

Lens surface data of Example 1 is shown in Table 1 below.

TABLE 1

| S (Surface No.) | R(mm) | D(mm) | Nd | vd | ER(mm) (Effective radius) |
|---|---|---|---|---|---|
| 1(stop) | infinite | −0.16 | | | 0.90 |
| 2* | 1.699 | 0.63 | 1.54470 | 56.2 | 0.95 |
| 3* | −12.145 | 0.05 | | | 0.95 |
| 4* | 3.731 | 0.28 | 1.63470 | 23.9 | 0.96 |
| 5* | 1.483 | 0.62 | | | 0.95 |
| 6* | 111.675 | 0.29 | 1.63470 | 23.9 | 1.12 |
| 7* | infinite | 0.36 | | | 1.26 |
| 8* | −6.238 | 0.84 | 1.54470 | 56.2 | 2.00 |
| 9* | −1.174 | 0.28 | | | 2.20 |
| 10* | −8.341 | 0.45 | 1.53050 | 55.7 | 2.26 |
| 11* | 1.499 | 0.64 | | | 2.53 |

TABLE 1-continued

| 12 | infinite | 0.30 | 1.51630 | 64.1 | 3.00 |
| 13 | infinite | | | | 3.00 |

Aspheric coefficients of lens surfaces of Example 1 are as follows.

Second surface

K = 0.44504E−01, A4 = 0.40998E−02, A6 = 0.37944E−02, A8 = −0.50547E−02, A10 = 0.42441E−02
Third surface K = 0.18502E+02, A4 = 0.28661E−01, A6 = 0.58087E−01, A8 = −0.10185E+00, A10 = 0.49818E−01
Fourth surface K = −0.29604E+02, A4 = −0.59078E−01, A6 = 0.18979E+00, A8 = −0.25797E+00, A10 = 0.15802E+00, A12 = −0.34719E−01
Fifth surface K = −0.54222E+01, A4 = 0.21660E−01, A6 = 0.10204E+00, A8 = −0.94379E−01, A10 = 0.49368E−01
Sixth surface K = −0.30000E+02, A4 = −0.12010E+00, A6 = −0.25758E−01, A8 = 0.53737E−01, A10 = 0.28385E−01, A12 = −0.22037E−01, A14 = −0.30444E−04
Seventh surface K = 0.99872E+01, A4 = −0.10811E+00, A6 = 0.11791E−01, A8 = 0.42148E−02, A10 = 0.30776E−01, A12 = −0.11369E−01, A14 = −0.46603E−03
Eighth surface K = 0.82457E+01, A4 = 0.34187E−02, A6 = 0.24714E−01, A8 = −0.53839E−02, A10 = −0.40527E−03, A12 = 0.16230E−03
Ninth surface K = −0.42354E+01, A4 = −0.50200E−01, A6 = 0.52215E−01, A8 = −0.11400E−01, A10 = 0.46422E−03, A12 = 0.40043E−04
Tenth surface K = 0.56545E+01, A4 = −0.37571E−01, A6 = 0.75089E−02, A8 = 0.13211E−02, A10 = −0.27060E−03, A12 = −0.11663E−04, A14 = 0.24727E−05
Eleventh surface K = −0.89122E+01, A4 = −0.59091E−01, A6 = 0.16009E−01, A8 = −0.35250E−02, A10 = 0.44081E−03, A12 = −0.24547E−04, A14 = 0.35000E−06

In the above-mentioned Table 1 and in the subsequent representation (surface data in Tables 3, 5, 7 and 9, etc.), a number expressed as a power of 10 in scientific notation (for example, $2.5 \times 10^{-02}$) is represented as (for example, 2.5 E-02) using symbol E.

Single lens data of Example 1 is shown in Table 2 below.

TABLE 2

| Lens | First surface | Focal length(mm) |
|---|---|---|
| 1 | 2 | 2.781 |
| 2 | 4 | −4.076 |
| 3 | 6 | 175.952 |
| 4 | 8 | 2.508 |
| 5 | 10 | −2.357 |

FIG. 1 is also a sectional diagram of an image pickup lens 11 of Example 1. That is, the image pickup lens 11 includes the first lens L1, the second lens L2, the third lens L3, the fourth lens L4, and the fifth lens L5. All the lenses L1 to L5 are formed of the plastic materials. On the object side of the first lens L1, the aperture stop S is disposed, and between the fifth lens L5 and the image pickup surface I, the parallel flat plate F is disposed.

FIG. 2A to FIG. 2C show aberration diagrams (spherical aberration, astigmatism, and distortion aberration) of the image pickup lens 11 of Example 1, and FIG. 2D and FIG. 2E show the meridional comatic aberration of the image pickup lens 11 of Example 1.

Example 2

General specifications of the image pickup lens of Example 2 are as follows.
f=5 mm
fB=0.8 mm
F=2.47
2Y=7.8 mm
ENTP=0 mm
EXTP=−5.04 mm
H1=0.72 mm
H2=−4.2 mm
Lens surface data of Example 2 is shown in Table 3 below.

TABLE 3

| S (Surface No.) | R(mm) | D(mm) | Nd | νd | ER(mm) (Effective radius) |
|---|---|---|---|---|---|
| 1(Stop) | infinite | 0.05 | | | 1.01 |
| 2* | 9.101 | 0.67 | 1.54470 | 56.2 | 1.03 |
| 3* | −4.063 | 0.34 | | | 1.22 |
| 4* | 5.307 | 0.40 | 1.63200 | 23.4 | 1.52 |
| 5* | 2.253 | 0.50 | | | 1.67 |
| 6* | 5.575 | 0.61 | 1.54470 | 56.2 | 1.86 |
| 7* | infinite | 0.72 | | | 1.92 |
| 8* | −2.710 | 1.12 | 1.54470 | 56.2 | 2.14 |
| 9* | −1.338 | 0.05 | | | 2.27 |
| 10* | 3.628 | 0.99 | 1.58300 | 30.0 | 2.83 |
| 11* | 1.321 | 0.83 | | | 3.47 |
| 12 | infinite | 0.48 | 1.51630 | 64.1 | 3.69 |
| 13 | infinite | | | | 3.79 |

Aspheric coefficients of Example 2 are as follows.

Second surface

K = −0.30000E+02, A4 = −0.21046E−01, A6 = −0.59261E−02,
A8 = −0.25609E−02, A10 = −0.31303E−02, A12 = 0.28389E−02,
A14 = −0.93068E−03

Third surface

K = 0.76859E+01, A4 = 0.16319E−02, A6 = −0.58503E−02,
A8 = 0.41599E−02, A10 = −0.14967E−02, A12 = −0.98328E−03,
A14 = 0.11189E−02

Fourth surface

K = 0.29008E+01, A4 = −0.40187E−01, A6 = 0.22047E−01,
A8 = −0.94282E−02, A10 = −0.10801E−02, A12 = 0.21430E−02,
A14 = −0.45436E−03

Fifth surface

K = −0.61508E+01, A4 = −0.75627E−02, A6 = 0.12510E−01,
A8 = −0.67476E−02, A10 = 0.24239E−03, A12 = 0.66842E−03,
A14 = −0.13584E−03

Sixth surface

K = −0.30000E+02, A4 = −0.14877E−01, A6 = −0.27320E−03,
A8 = −0.33863E−03, A10 = 0.10124E−02, A12 = −0.13701E−03,
A14 = −0.59364E−05

Seventh surface

K = 0.30000E+02, A4 = −0.22175E−01, A6 = 0.29966E−02,
A8 = −0.52952E−03, A10 = −0.35092E−04, A12 = 0.26557E−03,
A14 = −0.44412E−04

Eighth surface

K = −0.35482E+00, A4 = 0.16556E−01, A6 = −0.21707E−02,
A8 = 0.12279E−02, A10 = 0.11271E−03, A12 = −0.58785E−04,
A14 = 0.37705E−05

TABLE 3-continued

Ninth surface

K = −0.30815E+01, A4 = −0.35070E−01, A6 = 0.85999E−02,
A8 = −0.11712E−02, A10 = 0.13724E−03, A12 = 0.65754E−05,
A14 = −0.13827E−05

Tenth surface

K = −0.65419E+01, A4 = −0.24540E−01, A6 = 0.24743E−02,
A8 = −0.14964E−03, A10 = −0.39197E−04, A12 = 0.78227E−05,
A14 = −0.34789E−06

Eleventh surface

K = −0.47059E+01, A4 = −0.17153E−01, A6 = 0.23176E−02,
A8 = −0.32126E−03, A10 = 0.27414E−04, A12 = −0.13129E−05,
A14 = 0.27412E−07

Single lens data of Example 2 is shown in Table 4 below.

TABLE 4

| Lens | First surface | Focal length(mm) |
|---|---|---|
| 1 | 2 | 5.251 |
| 2 | 4 | −6.528 |
| 3 | 6 | 10.234 |
| 4 | 8 | 3.768 |
| 5 | 10 | −4.233 |

Figure 3:
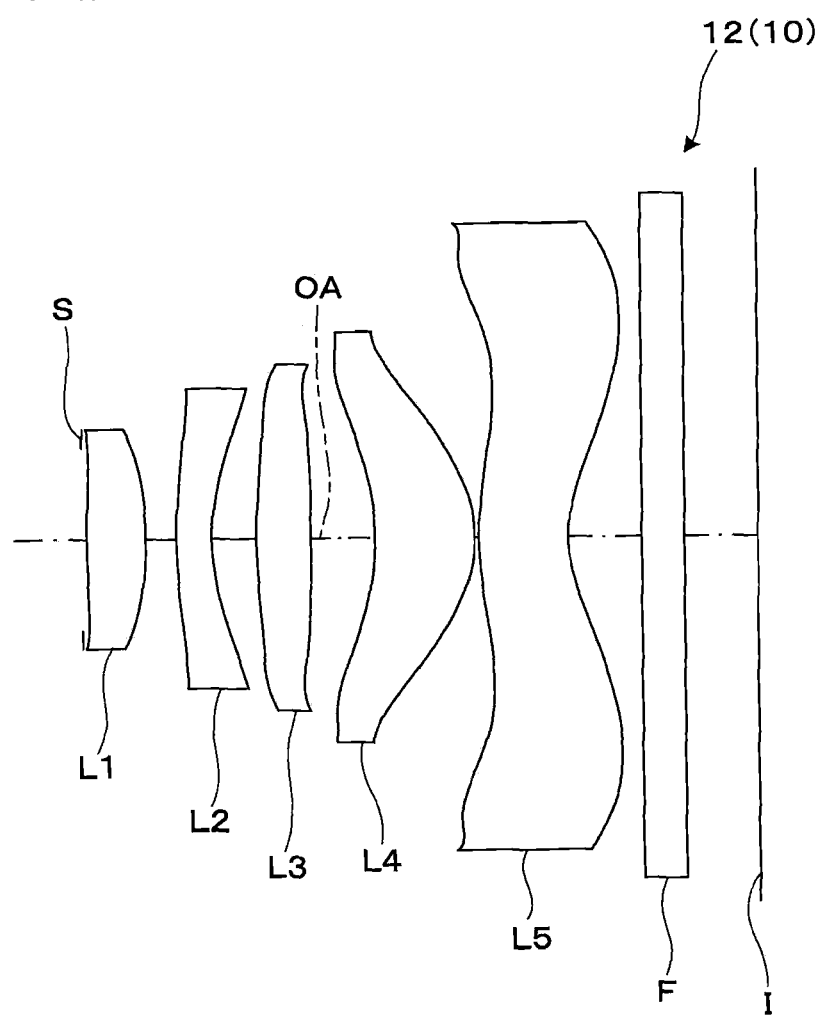
FIG. 3 is a sectional diagram of an image pickup lens of Example 2.

FIG. 3 is a sectional diagram of a lens of Example 2. An image pickup lens 12 includes the first lens L1, the second lens L2, the third lens L3, the fourth lens L4, and the fifth lens L5. All the lenses L1 to L5 are formed of the plastic materials. Between the first lens L1 and the second lens L2, the aperture stop S is disposed, and between the fifth lens L5 and the image pickup surface I, the parallel flat plate F is disposed.

FIG. 4A to FIG. 4C show aberration diagrams (spherical aberration, astigmatism, and distortion aberration) of the image pickup lens 12 of Example 2, and FIG. 4D and FIG. 4E show the meridional comatic aberration of the image pickup lens 12 of Example 2.

Example 3

General specifications of the image pickup lens of Example 3 are as follows.
f=3.77 mm
fB=0.31 mm
F=2.22
2Y=5.744 mm
ENTP=0.45 mm
EXTP=−2.68 mm
H1=−0.54 mm
H2=−3.46 mm
Lens surface data of Example 3 is shown in Table 5 below.

TABLE 5

| S (Surface No.) | R(mm) | D(mm) | Nd | νd | ER(mm) (Effective radius) |
|---|---|---|---|---|---|
| 1 | infinite | 0.00 | | | 1.24 |
| 2* | 2.059 | 0.62 | 1.54470 | 56.2 | 1.05 |
| 3* | −8.895 | 0.00 | | | 0.87 |
| 4(Stop) | infinite | 0.13 | | | 0.78 |
| 5* | 5.481 | 0.30 | 1.63200 | 23.4 | 0.83 |
| 6* | 1.777 | 0.38 | | | 0.91 |
| 7* | 7.286 | 0.55 | 1.54470 | 56.2 | 1.07 |
| 8* | infinite | 0.46 | | | 1.26 |
| 9* | −4.382 | 0.74 | 1.54470 | 56.2 | 1.49 |
| 10* | −0.949 | 0.07 | | | 1.68 |

TABLE 5-continued

| | | | | | |
|---|---|---|---|---|---|
| 11* | 11.478 | 0.63 | 1.54470 | 56.2 | 2.16 |
| 12* | 0.934 | 0.70 | | | 2.53 |
| 13 | infinite | 0.15 | 1.51630 | 64.1 | 2.74 |
| 14 | infinite | | | | 2.77 |

Aspheric coefficients of Example 3 are as follows.

Second surface

K = −0.11904E+00, A4 = −0.54113E−02, A6 = −0.72751E−02,
A8 = −0.10323E−03, A10 = −0.10448E−01, A12 = 0.80181E−02,
A14 = −0.96657E−02
Third surface K = −0.50000E+02, A4 = 0.23385E−01, A6 = −0.28146E−01,
A8 = −0.62676E−02, A10 = −0.17296E−01, A12 = −0.90549E−02,
A14 = 0.13679E−01
Fifth surface K = 0.18031E+02, A4 = −0.45742E−01, A6 = 0.68627E−01,
A8 = −0.83478E−01, A10 = −0.14043E−01, A12 = −0.69179E−02,
A14 = 0.36816E−01
Sixth surface K = −0.68533E+01, A4 = 0.47024E−01, A6 = 0.42894E−01,
A8 = −0.45330E−01, A10 = 0.10815E−01, A12 = −0.22690E−01,
A14 = 0.23264E−01
Seventh surface K = −0.50000E+02, A4 = −0.74717E−01, A6 = −0.95274E−02,
A8 = 0.12960E−01, A10 = 0.49737E−02, A12 = 0.57102E−02,
A14 = −0.25782E−02
Eighth surface K = −0.50000E+02, A4 = −0.69091E−01, A6 = −0.18568E−01,
A8 = −0.64327E−02, A10 = 0.26898E−02, A12 = 0.16055E−02,
A14 = 0.13501E−02
Ninth surface K = −0.17394E+01, A4 = 0.17210E−01, A6 = −0.12689E−01,
A8 = −0.17110E−02, A10 = −0.41842E−02, A12 = 0.37911E−03,
A14 = 0.68450E−03
Tenth surface K = −0.40110E+01, A4 = −0.58146E−01, A6 = 0.46928E−01,
A8 = −0.10916E−01, A10 = −0.49232E−03, A12 = −0.15936E−03,
A14 = 0.17116E−03
Eleventh surface K = 0.18490E+02, A4 = −0.69341E−01, A6 = 0.14933E−01,
A8 = −0.47869E−03, A10 = −0.46085E−03, A12 = 0.12694E−03,
A14 = −0.10880E−04
Twelfth surface K = −0.60972E+01, A4 = −0.46248E−01, A6 = 0.13074E−01,
A8 = −0.31341E−02, A10 = 0.35538E−03, A12 = −0.12274E−04,
A14 = −0.19232E−06

Single lens data of Example 3 is shown in Table 6 below.

TABLE 6

| Lens | First surface | Focal length(mm) |
|---|---|---|
| 1 | 2 | 3.132 |
| 2 | 5 | −4.296 |
| 3 | 7 | 13.376 |
| 4 | 9 | 2.067 |
| 5 | 11 | −1.908 |

Figure 5:
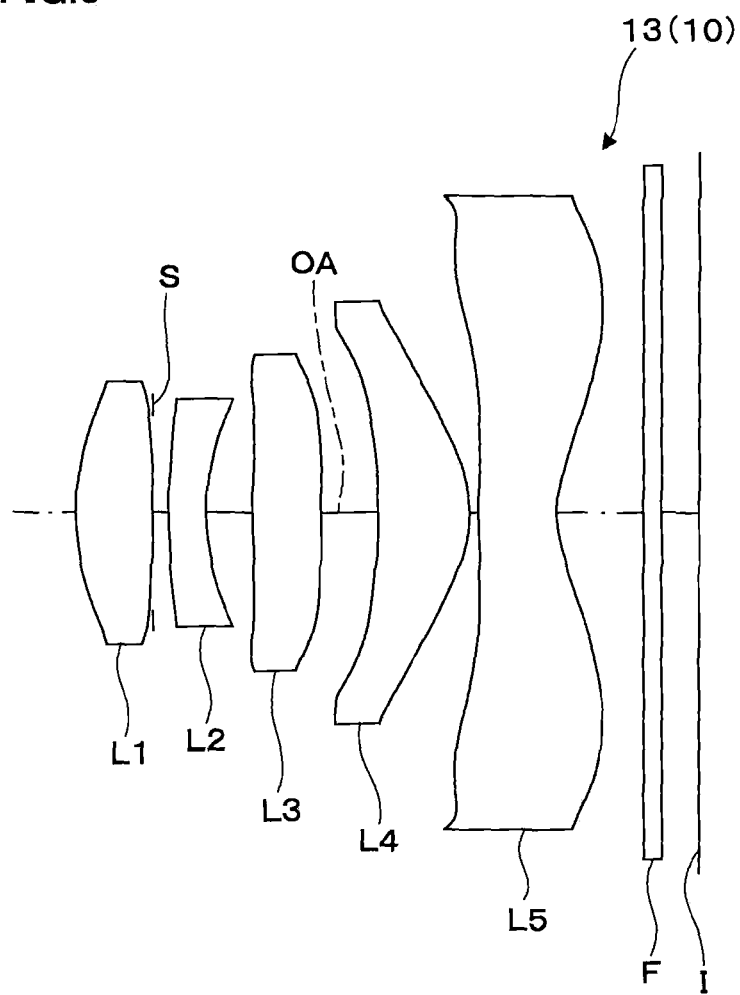
FIG. 5 is a sectional diagram of an image pickup lens of Example 3.

FIG. 5 is a sectional diagram of a lens of Example 3. An image pickup lens 13 includes the first lens L1, the second lens L2, the third lens L3, the fourth lens L4, and the fifth lens L5. All the lenses L1 to L5 are formed of the plastic materials. On the object side of the first lens L1, the aperture stop S is disposed and between the fifth lens L5 and the image pickup surface I, the parallel flat plate F is disposed.

Figure 6A:
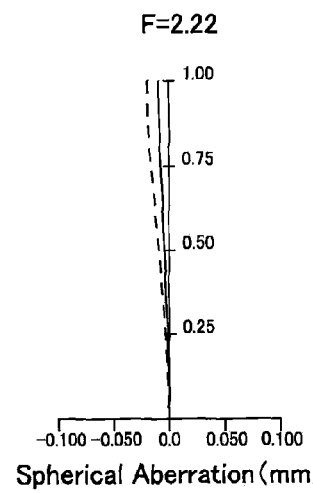
FIG. 6A to FIG. 6E are aberration diagrams of the image pickup lens of Example 3.
Figure 6B:
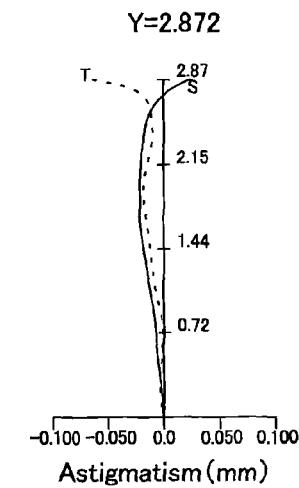
Figure 6C:
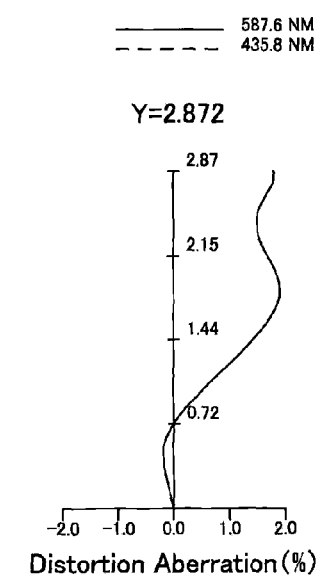
Figure 6D:
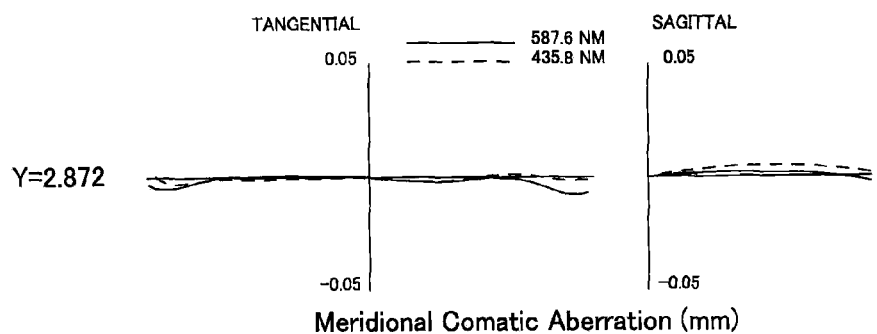
Figure 6E:
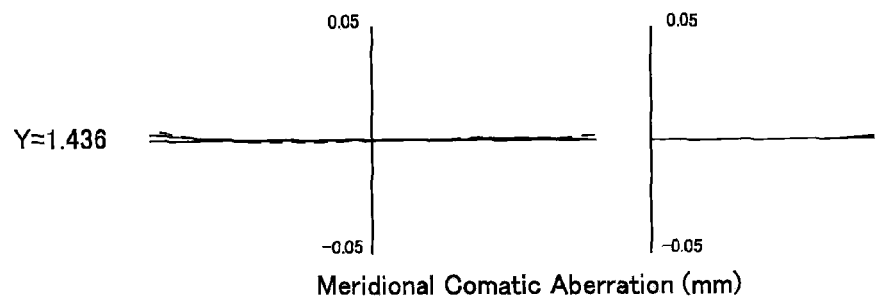

FIG. 6A to FIG. 6C show aberration diagrams (spherical aberration, astigmatism, and distortion aberration) of the image pickup lens 13 of Example 3, and FIG. 6D and FIG. 6E show the meridional comatic aberration of the image pickup lens 13 of Example 3.

Example 4

General specifications of the image pickup lens of Example 4 are as follows.

f=3.39 mm fB=0.31 mm

F=1.94

2Y=5.02 mm

ENTP=0 mm

EXTP=−2.27 mm

H1=−1.07 mm

H2=−3.09 mm

Lens surface data of Example 4 is shown in Table 7 below.

TABLE 7

| S (Surface No.) | R(mm) | D(mm) | Nd | νd | ER(mm) (Effective radius) |
|---|---|---|---|---|---|
| 1(Stop) | infinite | −0.07 | | | 0.87 |
| 2* | 1.724 | 0.59 | 1.54470 | 56.2 | 0.89 |
| 3* | −5.539 | 0.05 | | | 0.88 |
| 4* | 4.603 | 0.25 | 1.63470 | 23.9 | 0.87 |
| 5* | 1.492 | 0.43 | | | 0.90 |
| 6* | 8.788 | 0.56 | 1.54470 | 56.2 | 1.08 |
| 7* | infinite | 0.35 | | | 1.21 |
| 8* | −16.552 | 0.63 | 1.54470 | 56.2 | 1.37 |
| 9* | −0.900 | 0.09 | | | 1.66 |
| 10* | −5.883 | 0.49 | 1.53050 | 55.7 | 2.04 |
| 11* | 0.894 | 0.47 | | | 2.36 |
| 12 | infinite | 0.15 | 1.51630 | 64.1 | 2.60 |
| 13 | infinite | | | | 2.60 |

Aspheric coefficients of Example 4 are as follows.

Second surface

K = −0.21236E+00, A4 = −0.69579E−02, A6 = −0.47742E−02,
A8 = −0.66241E−01, A10 = 0.10041E+00, A12 = −0.92154E−01
Third surface K = 0.48802E+01, A4 = 0.34072E−01, A6 = 0.27625E−01,
A8 = −0.14466E+00, A10 = 0.42430E−01
Fourth surface K = −0.24698E+02, A4 = −0.10653E+00, A6 = 0.35385E+00,
A8 = −0.48130E+00, A10 = 0.22107E+00
Fifth surface K = −0.83808E+01, A4 = 0.84670E−01, A6 = 0.24345E−01,
A8 = 0.10482E+00, A10 = −0.23970E+00, A12 = 0.13839E+00
Sixth surface K = −0.48263E+02, A4 = −0.10178E+00, A6 = 0.22540E−01,
A8 = 0.22669E−01, A10 = −0.27843E−01, A12 = 0.61956E−01,
A14 = −0.27408E−01
Seventh surface K = 0.00000, A4 = −0.11552E+00, A6 = −0.18539E−01,
A8 = 0.33212E−02, A10 = 0.22281E−01, A12 = −0.28294E−01,
A14 = 0.20043E−01, A16 = −0.14261E−03
Eighth surface K = −0.80000E+02, A4 = −0.14537E−01, A6 = −0.27643E−01,
A8 = 0.60866E−02, A10 = −0.14501E−01, A12 = 0.43076E−02,
A14 = 0.57007E−03, A16 = −0.15732E−03

TABLE 7-continued

Ninth surface

K = −0.49592E+01, A4 = −0.55012E−01, A6 = 0.89105E−01,
A8 = −0.34348E−01, A10 = 0.16050E−03, A12 = 0.13061E−02,
A14 = 0.26622E−03, A16 = −0.11430E−03
Tenth surface K = 0.24032E+01, A4 = −0.86481E−01, A6 = 0.39750E−01,
A8 = 0.12003E−02, A10 = −0.23367E−02, A12 = −0.44502E−04,
A14 = 0.13134E−03, A16 = −0.14493E−04
Eleventh surface K = −0.69525E+01, A4 = −0.84373E−01, A6 = 0.36473E−01,
A8 = −0.10941E−01, A10 = 0.14582E−02, A12 = −0.16153E−04,
A14 = −0.12307E−04, A16 = 0.73443E−06

Single lens data of Example 4 is shown in Table 8 below.

TABLE 8

| Lens | First surface | Focal length(mm) |
|---|---|---|
| 1 | 2 | 2.485 |
| 2 | 4 | −3.590 |
| 3 | 6 | 16.134 |
| 4 | 8 | 1.724 |
| 5 | 10 | −1.427 |

Figure 7:
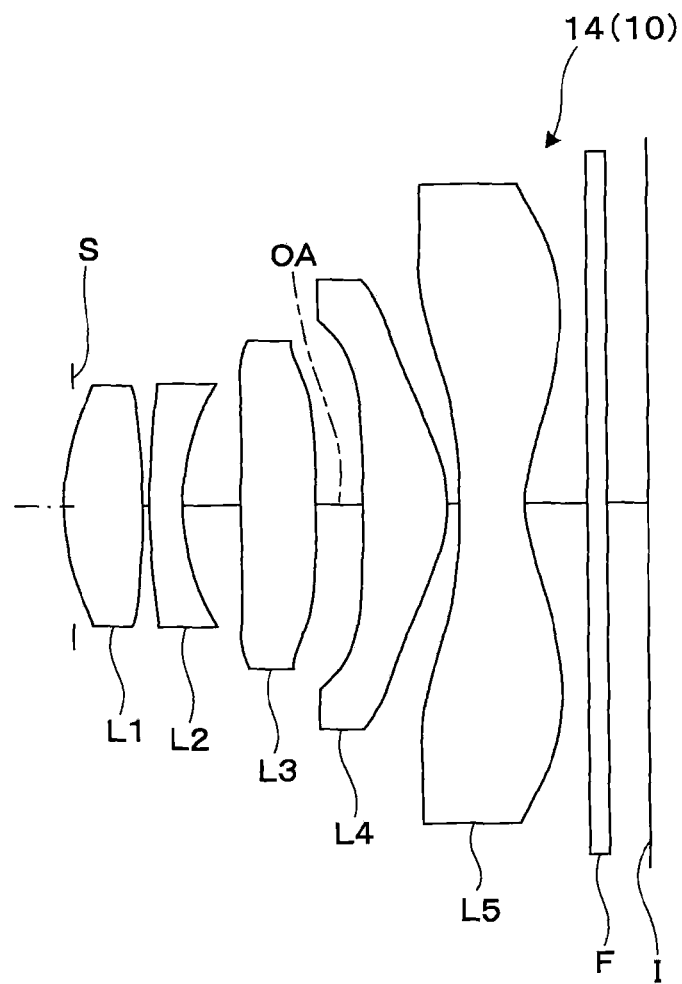
FIG. 7 is a sectional diagram of an image pickup lens of Example 4.

FIG. 7 is a sectional diagram of a lens of Example 4. An image pickup lens 14 includes the first lens L1, the second lens L2, the third lens L3, the fourth lens L4, and the fifth lens L5. All the lenses L1 to L5 are formed of the plastic materials. On the object side of the first lens L1, the aperture stop S is disposed, and between the fifth lens L5 and the image pickup surface I, the parallel flat plate F is disposed.

FIG. 8A to FIG. 8C show aberration diagrams (spherical aberration, astigmatism, and distortion aberration) of the image pickup lens 14 of Example 4 and FIG. 8D and FIG. 8E show the meridional comatic aberration of the image pickup lens 14 of Example 4.

Example 5

General specifications of the image pickup lens of Example 5 are as follows.
f=4.04 mm
fB=0.5 mm
F=2.4
2Y=6.496 mm
ENTP=0 mm
EXTP=−2.4 mm
H1=−1.59 mm
H2=−3.54 mm Lens surface data of Example 5 is shown in Table 9 below.

TABLE 9

| S (Surface No.) | R(mm) | D(mm) | Nd | vd | ER(mm) (Effective radius) |
|---|---|---|---|---|---|
| 1(Stop) | infinite | −0.02 | | | 0.84 |
| 2* | 1.881 | 0.61 | 1.54470 | 56.2 | 0.90 |
| 3* | −15.300 | 0.05 | | | 0.95 |
| 4* | 7.253 | 0.28 | 1.63470 | 23.9 | 0.98 |
| 5* | 2.112 | 0.37 | | | 1.01 |
| 6* | 6.648 | 0.52 | 1.54470 | 56.2 | 1.20 |
| 7* | infinite | 0.56 | | | 1.25 |
| 8* | 75.809 | 0.81 | 1.54470 | 56.2 | 1.63 |
| 9* | −1.034 | 0.20 | | | 2.03 |
| 10* | −1.419 | 0.42 | 1.53180 | 56.0 | 2.27 |
| 11* | 1.832 | 0.46 | | | 2.67 |
| 12 | infinite | 0.11 | 1.51630 | 64.1 | 3.30 |
| 13 | infinite | | | | 3.30 |

Aspheric coefficients of Example 5 are as follows.

Second surface

K = −0.40727E+00, A4 = −0.44823E−02, A6 = 0.20164E−02,
A8 = −0.55172E−01, A10 = 0.59655E−01, A12 = −0.44215E−01
Third surface K = −0.30000E+02, A4 = −0.21465E−01, A6 = 0.11882E−01,
A8 = −0.91243E−01, A10 = 0.39866E−01
Fourth surface K = −0.27166E+02, A4 = −0.58247E−01, A6 = 0.12451E+00,
A8 = −0.18171E+00, A10 = 0.97402E−01
Fifth surface K = −0.93951E+01, A4 = 0.49348E−01, A6 = 0.23325E−01,
A8 = 0.70558E−02, A10 = −0.30175E−01, A12 = 0.21252E−01
Sixth surface K = −0.16010E+02, A4 = −0.75681E−01, A6 = 0.27752E−01,
A8 = −0.14664E−01, A10 = 0.17377E−01, A12 = 0.16911E−01,
A14 = −0.96134E−02
Seventh surface K = 0.00000, A4 = −0.87570E−01, A6 = 0.71198E−02,
A8 = −0.46120E−02, A10 = 0.45812E−02, A12 = 0.26648E−02,
A14 = 0.23086E−02, A16 = 0.13075E−03
Eighth surface K = −0.30000E+02, A4 = −0.60395E−01, A6 = 0.45548E−02,
A8 = 0.34199E−02, A10 = −0.78718E−02, A12 = 0.97665E−03,
A14 = 0.14678E−02, A16 = −0.35112E−03
Ninth surface K = −0.43352E+01, A4 = −0.52627E−01, A6 = 0.40367E−01,
A8 = −0.62722E−02, A10 = −0.48695E−03, A12 = 0.97082E−04,
A14 = 0.32418E−04, A16 = −0.68061E−05
Tenth surface K = −0.56728E+01, A4 = −0.51415E−01, A6 = 0.16543E−01,
A8 = 0.49346E−03, A10 = −0.34015E−03, A12 = −0.25670E−04,
A14 = 0.59281E−05, A16 = 0.20149E−07
Eleventh surface K = −0.16857E+02, A4 = −0.28576E−01, A6 = 0.53054E−02,
A8 = −0.12916E−02, A10 = 0.16671E−03, A12 = −0.64299E−05,
A14 = −0.14109E−05, A16 = 0.16230E−06

Single lens data of Example 5 is shown in Table 10 below.

TABLE 10

| Lens | First surface | Focal length(mm) |
|---|---|---|
| 1 | 2 | 3.114 |
| 2 | 4 | −4.796 |
| 3 | 6 | 12.205 |
| 4 | 8 | 1.879 |
| 5 | 10 | −1.439 |

Figure 9:
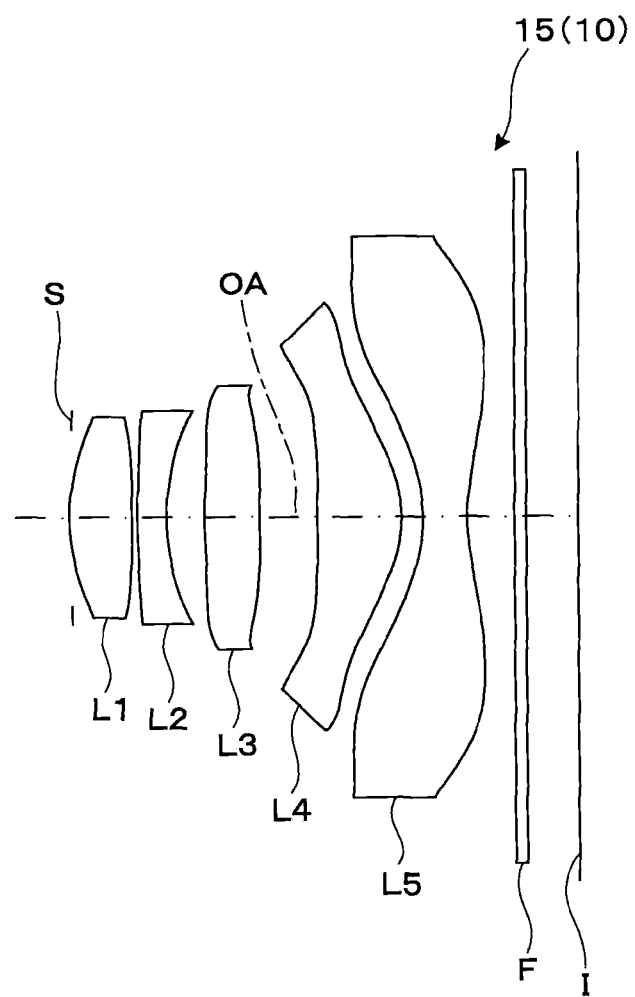
FIG. 9 is a sectional diagram of an image pickup lens of Example 5.

FIG. 9 is a sectional diagram of a lens of Example 5. An image pickup lens 15 includes the first lens L1, the second lens L2, the third lens L3, the fourth lens L4, and the fifth lens L5. All the lenses L1 to L5 are formed of the plastic materials. On the object side of the first lens L1, the aperture stop S is disposed, and between the fifth lens L5 and the image pickup surface I, the parallel flat plate F is disposed.

FIG. 10A to FIG. 10C show aberration diagrams (spherical aberration, astigmatism, and distortion aberration) of the image pickup lens 15 of Example 5, and FIG. 10D and FIG. 10E show the meridional comatic aberration of the image pickup lens 15 of Example 5.

In Table 11 below, the values of each of Examples 1 to 5 corresponding to each of the conditional expressions (1) to (5), (7), (6), (10), and (12) to (15) are summarized for reference.

TABLE 11

| Conditional Expression | Example 1 | Example 2 | Example 3 | Example 4 | Example 5 |
|---|---|---|---|---|---|
| (1) f/r6 | 0.00 | 0.00 | 0.00 | 0.00 | 0.00 |
| (2) (SAG6P/f) * 1000 | 2.69 | 1.45 | 2.12 | 3.75 | 2.57 |
| (3) \|P3\|/P | 0.02 | 0.49 | 0.28 | 0.21 | 0.33 |
| (4) d34/f | 0.08 | 0.14 | 0.12 | 0.10 | 0.14 |
| (5) Pair23/P | −1.82 | −0.84 | −1.02 | −1.19 | −0.84 |
| (7) (r7 + r8)/(r7 − r8) | 1.46 | 2.95 | 1.55 | 1.12 | 0.97 |
| (8) Pair34/P | −0.38 | −1.00 | −0.47 | −0.11 | 0.03 |
| (10) Pair12/P | 0.93 | 1.24 | 0.66 | 0.80 | 0.50 |
| (12) f34/f | 0.58 | 0.66 | 0.52 | 0.49 | 0.45 |
| (13) f123/f | 1.28 | 1.40 | 1.35 | 1.27 | 1.14 |
| (14) ν2 | 23.9 | 23.4 | 23.4 | 23.9 | 23.9 |
| (15) ν3 | 23.9 | 56.0 | 56.0 | 56.0 | 56.0 |

As described above, in the image pickup lens 10 of the embodiment and the image pickup lenses 11 to 15 in each of Examples 1 to 5, all the lenses L1 to L5 are formed of the plastic materials. However, in the plastic material, the change in refractive index when temperature changes is large, and therefore, if all the lenses L1 to L5 are configured by plastic lenses, the possibility is raised that the image point position in the entire system of the image pickup lens 10 varies when the ambient temperature changes. In contrast to this, in recent years, it has been found that the change in temperature of the plastic material can be reduced by mixing inorganic fine grains into the plastic material. To explain in detail, in general, when fine transparent grains are mixed into the transparent plastic material, light is scattered and the transmittance is reduced, and therefore, it is difficult to use the plastic material as an optical material, but, it is possible to substantially prevent scattering from occurring by reducing the fine grain size smaller than the wavelength of the transmitted light rays. The refractive index of the plastic material decreases when temperature rises, but, the refractive index of the inorganic fine grain increases when temperature rises. Because of this, it is possible to substantially prevent the change in refractive index from occurring by causing these temperature dependences to cancel out each other. Specifically, by dispersing inorganic fine grains having a maximum length of 20 nanometers or less in the plastic material, which is the base material, the plastic material turns into a plastic material in which the dependence of the refractive index on temperature is very slight. For example, by dispersing fine grains of niobium oxide ($Nb_2O_5$) in acryl, it is possible to reduce the change in refractive index when temperature changes. In the present invention, by using the plastic material in which such inorganic fine grains are dispersed for the positive lens L1 having a comparatively large power or for all the lenses L1 to L5, it is made possible to suppress small the variations in the image point position when temperature changes in the entire system of the image pickup lens 10.

Further, in recent years, as a method for mounting image pickup apparatuses at low costs and in a large number, the technique has been proposed, which mounts electronic parts and optical elements at the same time on a substrate by performing reflow processing (heating processing) on the substrate on which solder is potted in advance while leaving IC chips and other electronic parts and optical elements thereon so as to melt the solder. When performing such reflow processing, it is necessary to heat both the electronic parts and the optical elements to about 200° C. to 260° C., but, at such high temperatures, there is such a problem that lenses using a thermoplastic resin deform or discolor and their optical performance is reduced. As one of methods for solving such a problem, a technique has been proposed, which causes downsizing and optical performance in a high temperature environment to coexist by using a glass mold lens excellent in heat-resistant performance, but, the glass mold lens costs more than a lens using a thermoplastic resin, and therefore, there used to be such a problem that the request to reduce costs of the image pickup apparatus cannot be met. Because of the above, the image pickup lens is made so that the optical performance deteriorates less when exposed to high temperature, and is further made more effective in reflow processing compared to a lens using a thermoplastic resin, such as a polycarbonate based or polyolefin based resin and easier to manufacture and less expensive than a glass mold lens, by using an energy curable resin for the material of the image pickup lens, and therefore, it is possible to cause low costs and mass-productivity of the image pickup apparatus incorporating the image pickup lens to coexist. The energy curable resin refers to both the thermosetting resin and the UV-curable resin. It may be possible to form the lenses L1 to L5 configuring the image pickup lens 10 of the present invention by using the energy curable resin described above.

In the above-mentioned embodiment, the angles of incidence of the principal rays that impinge the image pickup surface I of the photoelectric conversion part 20 provided in the solid-state image sensor are not necessarily designed to be sufficiently small on the periphery of the image pickup surface I. Due to the recent technique, it is made possible to reduce shading by reviewing the array of the color filters and on-chip microlens arrays provided in the photoelectric conversion part 20. Specifically, if the pitch of the array of the color filters and on-chip microlens arrays is set to a pitch slightly smaller than the pixel pitch of the image pickup surface I of the photoelectric conversion part 20, the color filter and the on-chip microlens array shift more toward the optical axis OA side of the image pickup lens 10 with respect to each pixel on the periphery nearer to the periphery of the image pickup surface I, and therefore, it is possible to effectively guide the obliquely incident ray to the image pickup surface of each pixel. Due to this, it is possible to suppress small the shading that occurs in the photoelectric conversion part 20. The image pickup lenses 11 to 15 of Examples described above are examples of the design aiming at further downsizing according to the above-described requests made less stringent.

Further in the above-mentioned embodiment, the image pickup lenses 11 to 15 of Examples described above are configured by the five lenses L1 to L5, but it is possible to add one or more lenses having substantially no power before and after, or between the lenses L1 to L5.

Although the present invention has been described in connection with the preferred embodiments above, it is to be noted that various changes and modifications are possible to those who are skilled in the art. Such changes and modifications are to be understood as being within the scope of the invention.

What is claimed is:

1. An image pickup lens for forming an image of a subject on a photoelectric conversion part of a solid-state image sensor, substantially consisting of, in order from an object side thereof:

a first lens having a positive power and having a convex surface directed to an object side;
a second lens of a meniscus shape having a negative power and having a convex surface directed to the object side;
a third lens having an aspheric shape on an image side surface;
a fourth lens having a positive power and having a convex surface directed to the image side; and
a fifth lens having a negative power and having a concave surface directed to the image side,
wherein an image side surface of said fifth lens has an aspheric shape and has an inflection point at a position other than an intersection with an optical axis, and
the image pickup lens satisfies conditional expressions below, $$-0.003 < f/r6 < 0.003 \quad (1)$$

$$0 < (SAG6P/f) \times 1,000 < 10.0 \quad (2)$$

where f is the focal length of the entire system of said image pickup lens, r6 is the radius of curvature on the image side surface of said third lens, and SAG6P is the maximum amount of sag in the region through which the axial light rays on the image side surface of said third lens passes.

2. The image pickup lens according to claim 1, wherein the image pickup lens satisfies the following conditional expression, $$0 < |P3|/P < 0.60 \quad (3)$$

where P3 is the power of said third lens and P is the power of the entire system of said image pickup lens.

3. The image pickup lens according to claim 1, wherein the image pickup lens satisfies the following conditional expression, $$0.05 < d34/f < 0.20 \quad (4)$$

where d34 is an air separation on the axis between said third lens and said fourth lens and f is the focal length of the entire system of said image pickup lens.

4. The image pickup lens according to claim 1, wherein the image pickup lens satisfies the following conditional expression, $$-2.0 < Pair23/P < -0.6 \quad (5)$$

where P is the power of the entire system of said image pickup lens and Pair23 is the power of a so-called air lens formed by the image side surface of said second lens and the object side surface of said third lens and the power is an inverse of the focal length and said Pair23 can be found by the following expression (6), $$Pair23 = \frac{1-n2}{r4} + \frac{n3-1}{r5} - \frac{(1-n2)(n3-1) \times d23}{r4 \times r5} \quad (6)$$

where n2 is the refractive index for d-line of said second lens, n3 is the refractive index for d-line of said third lens, r4 is the radius of curvature of the image side surface of said second lens, r5 is the radius of curvature of the object side surface of said third lens, and d23 is an air separation on the axis between said second lens and the third lens.

5. The image pickup lens according to claim 1, wherein the image pickup lens satisfies the following conditional expression, $$1.0 < (r7+r8)/(r7-r8) < 4.0 \quad (7)$$

where r7 is the radius of curvature of the object side surface of said fourth lens and r8 is the radius of curvature of the image side surface of said fourth lens.

6. The image pickup lens according to claim 1, wherein the image pickup lens satisfies the following conditional expression, $$-1.2 < Pair34/P < 0 \quad (8),$$

where P is the power of the entire system of said image pickup lens and Pair34 is the power of a so-called air lens formed by the image side surface of said third lens and the object side surface of said fourth lens and the power is an inverse of the focal length and said Pair34 can be found by the following expression (9), $$Pair34 = \frac{1-n3}{r6} + \frac{n4-1}{r7} - \frac{(1-n3)(n4-1) \times d34}{r6 \times r7} \quad (9)$$

where n3 is the refractive index for d-line of said third lens, n4 is the refractive index for d-line of said fourth lens, r6 is the radius of curvature of the image side surface of said third lens, r7 is the radius of curvature of the object side surface of said fourth lens, and d34 is an air separation on the axis between said third lens and said fourth lens.

7. The image pickup lens according to claim 1, wherein the image pickup lens satisfies the following conditional expression, $$0.4 < Pair12/P < 1.5 \quad (10),$$

where P is the power of the entire system of said image pickup lens and Pair12 is the power of a so-called air lens formed by the image side surface of said first lens and the object side surface of said second lens and the power is an inverse of the focal length and said Pair12 can be found by the following expression (11), $$Pair12 = \frac{1-n1}{r2} + \frac{n2-1}{r3} - \frac{(1-n1)(n2-1) \times d12}{r2 \times r3} \quad (11)$$

where n1 is the refractive index for d-line of said first lens, n2 is the refractive index for d-line of said second lens, r2 is the radius of curvature of the image side surface of said first lens, r3 is the radius of curvature of the object side surface of said second lens, and d12 is an air separation on the axis between said first lens and said second lens.

8. The image pickup lens according to claim 1, wherein the image pickup lens satisfies the following conditional expression, $$0.4 < f34/f < 0.7 \quad (12)$$

where f34 is the composite focal length of said third lens and said fourth lens and f is the focal length of the entire system of said image pickup lens.

9. The image pickup lens according to claim 1, wherein the image pickup lens satisfies the following conditional expression, $$1.0 < f123/f < 1.6 \quad (13)$$

where f123 is the composite focal length of said first lens to said third lens and f is the focal length of the entire system of said image pickup lens.

10. The image pickup lens according to claim 1, wherein said third lens has a positive power.

11. The image pickup lens according to claim 1,
wherein the image pickup lens satisfies the following conditional expressions, $$15 < v2 < 31 \qquad (14)$$

$$15 < v3 < 31 \qquad (15)$$

where v2 is the Abbe number of said second lens and v3 is the Abbe number of said third lens.

12. The image pickup lens according to claim 11, wherein the image side surface of said third lens has a negative power on the outermost periphery.

13. The image pickup lens according to claim 1, further having a lens having substantially no power.

* * * * *